US009425923B2

(12) United States Patent
Ratasuk et al.

(10) Patent No.: US 9,425,923 B2
(45) Date of Patent: Aug. 23, 2016

(54) METHOD, APPARATUS, COMPUTER PROGRAM PRODUCT, COMPUTER READABLE MEDIUM AND SYSTEM FOR FAST FEEDBACK AND RESPONSE HANDLING IN WIRELESS NETWORKS

(75) Inventors: Rapeepat Ratasuk, Hoffman Estates, IL (US); Timothy Thomas, Palatine, IL (US); Frederick Vook, Schaumburg, IL (US); Amitabha Ghosh, Buffalo Grove, IL (US); Mark Cudak, Rolling Meadows, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/417,382

(22) PCT Filed: Jul. 27, 2012

(86) PCT No.: PCT/US2012/048536
§ 371 (c)(1),
(2), (4) Date: Mar. 12, 2015

(87) PCT Pub. No.: WO2014/018052
PCT Pub. Date: Jan. 30, 2014

(65) Prior Publication Data
US 2015/0215077 A1    Jul. 30, 2015

(51) Int. Cl.
*H04W 36/00*    (2009.01)
*H04L 1/18*    (2006.01)
(Continued)

(52) U.S. Cl.
CPC ........... *H04L 1/1812* (2013.01); *H04B 7/0617* (2013.01); *H04B 7/0623* (2013.01);
(Continued)

(58) Field of Classification Search
CPC .......................... H04L 1/1812; H04B 7/0623
USPC ......................................................... 455/436
See application file for complete search history.

(56) References Cited

U.S. PATENT DOCUMENTS 5,894,598 A    4/1999    Shoki
2003/0054812 A1    3/2003    Hunzinger
(Continued)

FOREIGN PATENT DOCUMENTS

| CN | 101453306 A | 6/2009 |
| JP | 2010-161513 A | 7/2010 |
| WO | WO 2011/114412 A1 | 9/2011 |

OTHER PUBLICATIONS

IEEE Standard for Information technology—Telecommunications and Information exchange between systems—Local and metropolitan area networks—Specific requirements—"Part 15.3: Wireless Medium Access Control (MAC) and Physical Layer (PHY) Specifications for High Rate Wireless Personal Area Networks (WPANs)—Amendment 2: Millimeter-wave-based Alternative Physical Layer Extension," IEEE Std 802.15.c-2009 (Amendment to IEEE Std 802.15.3-2003), Oct. 12, 2009, 203 pages.

(Continued)

*Primary Examiner* — Thomas Lett
(74) *Attorney, Agent, or Firm* — Squire Patton Boggs (US) LLP

(57) ABSTRACT

Communication systems may employ transmission of feedback information and responses thereto, on a wireless connection such as a millimeter wave connection. The feedback information itself may be used to influence the beamforming or beam direction used for the transmission of the feedback information. A method can comprise determining a feedback indicator regarding reception of a transmitted waveform. The method can also comprise tailoring, for example beamforming, a signal for transmitting the feedback indicator based on a content of the feedback indicator.

11 Claims, 7 Drawing Sheets

(51) Int. Cl.
*H04B 7/06* (2006.01)
*H04B 7/08* (2006.01)
*H04W 16/28* (2009.01)
*H04W 36/26* (2009.01)
*H04W 72/04* (2009.01)

(52) U.S. Cl.
CPC ............ *H04B7/0695* (2013.01); *H04B 7/088* (2013.01); *H04W 16/28* (2013.01); *H04W 36/26* (2013.01); *H04W 72/042* (2013.01)

(56) References Cited

U.S. PATENT DOCUMENTS

| | | |
|---|---|---|
| 2004/0014429 A1 | 1/2004 | Guo |
| 2004/0228417 A1 | 11/2004 | Kennedy et al. |
| 2009/0312044 A1 | 12/2009 | Hottinen |
| 2010/0111215 A1 | 5/2010 | Nandagopalan et al. |
| 2011/0305162 A1 | 12/2011 | Morioka |
| 2013/0002487 A1 | 1/2013 | Hosoya et al. |

OTHER PUBLICATIONS

IEEE P802.11ad/D5.0; Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad/D5.0, Sep. 2011 (Draft Amendment based on IEEE P802.11REVmb D10.0) 601 pages.
International Search Report dated Oct. 16, 2012 corresponding to International Patent Application No. PCT/US2012/048536.
European Search Report dated Jan. 26, 2016 corresponding to European Patent Application No. 12881725.1.

METHOD, APPARATUS, COMPUTER PROGRAM PRODUCT, COMPUTER READABLE MEDIUM AND SYSTEM FOR FAST FEEDBACK AND RESPONSE HANDLING IN WIRELESS NETWORKS

BACKGROUND

1. Field

The invention, in certain embodiments, relates to communication systems which may employ transmission of feedback information and responses thereto, on a wireless connection.

2. Description of the Related Art

Wireless data traffic is projected to grow significantly. However, innovations in cellular air-interface design, culminating in the third generation partnership project (3GPP) long term evolution (LTE), provide spectral efficiency performance that may not be able to improve at a corresponding rate. To meet the growing traffic demand, other approaches may be used, such as increasing the cellular capacity per square meter by either shrinking cell-sizes or acquiring additional spectrum. For example, smaller cells may be implemented through heterogeneous networks of picos and macros, such as for carrier frequencies below 6 GHz, for example LTE heterogeneous network (HetNet). Similarly, 500 MHz of more spectrum is being made available below 5 GHz, which may help to meet the growing demand. This added spectrum, however, may also eventually be outpaced by the demand. Moreover, the available spectrum below 6 GHz is limited and there may be practical limits to how small cells can shrink. Thus, resources in frequencies above 6 GHz may be used to meet this demand for future (for example beyond 4G) cellular systems.

Unlike traditional cellular systems, electromagnetic (EM) waves in for example the millimeters bands (for example, for frequencies above 6 GHz) do not benefit from diffraction and dispersion, making it difficult for them to propagate around obstacles. Moreover, such millimeter waves also suffer higher penetration loss in some materials. For example, penetration loss of concrete block is 10 times higher at millimeter bands as compared to microwave bands. As a result, millimeter transmissions may be much more likely to encounter shadowing effects than microwave transmission. Millimeter transmissions may also have less favorable link budgets due to lower power amplifier (PA) output powers and greater pathloss at these higher frequencies.

As a result, to provide sufficient coverage from each access point, for example, 100 meter radius, narrow directional antenna array beams may be used both at the access point (AP) and the user equipment (UE).

The smaller wavelengths may allow for fabrication of much larger antenna arrays in much smaller areas than is typical at microwave bands. For example, arrays with as many as 8 to 32 elements providing 18 to 30 dB in link budget gain may be implemented. Reliance on these array gains can complicate link acquisition and maintenance. Traditional cellular systems, such as 3G LTE, cannot simply be upbanded and expected to function in the millimeter bands.

For example, because of the large number of antennas, the beam created by the array may be fairly narrow. With narrow beams, the user equipment may lose radio connection to the access point in case of blockage or misalignment. This may be due to, for example, obstruction between the user equipment and access point by objects, such as humans, trees, cars, or the like. Misalignment may be due to misalignment of the antenna array beams caused by wind-induced vibrations at the access point, or beam misalignment due to changes in user orientation, for example, due to how a device is held.

Current cellular radio standards such as 3GPP LTE provide solutions for frequency bands below 6 GHz which have well known propagation characteristics. A LTE system which is simply upbanded to 70 GHz would not provide adequate coverage or economy. LTE relies on radio wave diffraction around obstacles and therefore an LTE millimeter wave system would not achieve a reasonable coverage reliability target, for example 90% coverage reliability. Similarly, the power efficiency of semiconductor devices is reduced at frequencies above 10 GHz. LTE, which employs OFDM modulation, conventionally requires a significant Power Amplifier (PA) backoff making the solution less desirable at 70 GHz.

Local area solutions such as IEEE 802.11ad and IEEE 802.15.c exist and define air interfaces for local area access. The solutions are typically targeted to indoor deployments or for personal area networks. For example, 10 meter ranges are typically sited as a solution.

For future (e.g., beyond 4G (B4G)) cellular system, one access architecture for deployment of cellular radio equipment may employ millimeter wave (mmWave) radio spectrum. Example requirements for B4G include peak data rate of 20-30 Gbps and latency of less than 1 ms. To allow this, several features may be required, very high bandwidth, very small subframe size, near line-of-sight with rapid site selection and collaboration, and narrow beam-width. There are two main issues related to latency, as discussed below.

In Rel-10 LTE, user equipment category 8 is capable of supporting a maximum transport block size (TBS) of 2998560 per 1 ms transmission time interval (TTI) which is equivalent to 3 Gbps (assuming 5 carriers are aggregated using 8×8 multiple input multiple output (MIMO)). The processing time requirement for this user equipment may be 3 ms. In B4G, if the subframe size is reduced to 0.1 ms and the peak data rate is 30 Gbps, then the user equipment may be required to processing the same maximum TBS as user equipment category 8 but for a 0.1 ms subframe. Using current technology, the processing time for this user equipment will remain 3 ms, which is significantly longer than the subframe length and therefore likely to introduced large latency when retransmission is required. Even with significant improvement in user equipment processing capability, the reduced processing time (e.g. 1 ms) may still be significantly larger than the subframe size and can lead to unnecessarily large latency.

Secondly, with mmWave and narrow beams, the user equipment may lose connection to the transmission point, for example, due to blockage or misalignment of the antenna array beams caused by human movement or by wind-induced vibrations at the access point, and may require rapid site selection. However, the transmission/reception point may require feedback from the user equipment that connection has been lost. Traditionally, the eNB may wait for HARQ feedback from the user equipment to determine that connection has been lost. However, this can take a long time due to user equipment processing requirement as discussed above.

SUMMARY

According to a first embodiment, a method can comprise determining a feedback indicator regarding reception of a transmitted waveform. The method can also comprise tailoring a signal for transmitting the feedback indicator based on a content of the feedback indicator.

In the method of the first embodiment, the tailoring may comprise selecting a modified beam with respect to a previously used beam based on the content of the feedback indicator.

In the method of the first embodiment, the tailoring may comprise selecting a broader beam than a beam used during attempted reception of the transmitted waveform.

In the method of the first embodiment, the tailoring may comprise selecting a beam with a direction different from a beam used during attempted reception of the transmitted waveform.

In the method of the first embodiment, the tailoring may comprise selecting a beam directed to a network element that provided the transmitted waveform on a bearing corresponding to a reflected path to the network element.

In the method of the first embodiment, the tailoring may comprise selecting a beam directed to a second network element, other than a first network element that provided the transmitted waveform, on a bearing corresponding to the second network element.

In the method of the first embodiment, the tailoring may comprise selecting a plurality of directions corresponding to at least one of known paths to a network element that provided the transmitted waveform or known paths to a plurality of network elements.

The method of the first embodiment may also comprise maintaining a list of possible link directions for at least one network element, wherein the tailoring may be based on the list.

In the method of the first embodiment, the at least one network element may comprise a plurality of network elements or all network elements of a cluster of network elements.

In the method of the first embodiment, the tailoring may comprise selecting an omnidirectional beam.

The method of the first embodiment may further comprise determining that the signal produced by the tailoring has not been successfully received. The method may also comprise re-directing the feedback indicator to a second network element other than a first network element that transmitted the transmitted waveform.

The method of the first embodiment may additionally comprise providing, in the feedback indicator, a predictive acknowledgment regarding a number of retransmissions necessary to correctly receive the transmitted waveform.

In the method of the first embodiment, the tailoring may comprise at least one of beamforming, increasing a spreading factor, decreasing a modulation and coding scheme, or increasing a repetition factor.

According to a second embodiment, a method can comprise transmitting, from a first network element to a second network element, a transmitted waveform using a transmission pattern. The method may also comprise tailoring a reception pattern to receive a feedback indicator regarding the transmitted waveform from the second network element. The reception pattern comprise a broader beam than the transmission pattern.

In the method of the second embodiment, the tailoring may comprise at least one of selecting an omnidirectional pattern or selecting a beam with maximal gain in two dominant paths to the second network element.

The method of the second embodiment may further comprise determining that no feedback to the transmitted waveform has been received. The method may also comprise performing at least one of rapid searches or beam realignment with respect to the second network element.

The method of the second embodiment may additionally comprise receiving a predictive acknowledgement from the second network element, wherein the predictive acknowledgment may be indicative of a number of retransmissions necessary to correctly receive the transmitted waveform. The method may also comprise making adjustments to transmissions to the second network element based on the predictive acknowledgement.

The method of the second embodiment may further comprise collecting information based on at least one of data content of the feedback indicator, a signal characteristic of the feedback indicator, absence of the feedback indicator, or negative acknowledgments of the transmitted waveform. Moreover, the method of the second embodiment may also comprise deciding whether to hand over the connection based on the collected information.

In the method of the second embodiment, the hand over may comprise a handover to at least one of a layer different from a current layer or a radio access technology different from a current radio access technology.

The method of the second embodiment may also comprise initiating retransmission of the transmitted waveform via another layer or radio access technology based on the feedback indicator.

In a third embodiment, an apparatus can comprise at least one processor and at least one memory comprising computer program code. The at least one memory and the computer program code can be configured to, with the at least one processor, cause the apparatus at least to determine a feedback indicator regarding reception of a transmitted waveform. The at least one memory and the computer program code can also be configured to, with the at least one processor, cause the apparatus at least to tailor a signal for transmitting the feedback indicator based on a content of the feedback indicator.

In the third embodiment, the at least one memory and the computer program code may also be configured to, with the at least one processor, cause the apparatus at least to tailor by selecting a modified beam with respect to a previously used beam based on the content of the feedback indicator.

In the third embodiment, the at least one memory and the computer program code may further be configured to, with the at least one processor, cause the apparatus at least to tailor by selecting a broader beam than a beam used during attempted reception of the transmitted waveform.

In the third embodiment, the at least one memory and the computer program code may additionally be configured to, with the at least one processor, cause the apparatus at least to tailor by selecting a beam with a direction different from a beam used during attempted reception of the transmitted waveform.

In the third embodiment, the at least one memory and the computer program code may also be configured to, with the at least one processor, cause the apparatus at least to tailor by selecting a beam directed to a network element that provided the transmitted waveform on a bearing corresponding to a reflected path to the network element.

In the third embodiment, the at least one memory and the computer program code may further be configured to, with the at least one processor, cause the apparatus at least to tailor by selecting a beam directed to a second network element, other than a first network element that provided the transmitted waveform, on a bearing corresponding to the second network element.

In the third embodiment, the at least one memory and the computer program code may additionally be configured to, with the at least one processor, cause the apparatus at least to tailor by selecting a plurality of directions corresponding to at least one of known paths to a network element that provided the transmitted waveform or known paths to a plurality of network elements.

In the third embodiment, the at least one memory and the computer program code may also be configured to, with the at least one processor, cause the apparatus at least to maintain a list of possible link directions for at least one network element, wherein the tailoring may be based on the list.

In the third embodiment, wherein the at least one network element on the list may comprise a plurality of network elements or all network elements of a cluster of network elements.

In the third embodiment, the at least one memory and the computer program code may also be configured to, with the at least one processor, cause the apparatus at least to tailor by selecting an omnidirectional beam.

In the third embodiment, the at least one memory and the computer program code may also be configured to, with the at least one processor, cause the apparatus at least to determine that the signal produced by the tailoring has not been successfully received. The at least one memory and the computer program code may further be configured to, with the at least one processor, cause the apparatus at least to re-direct the feedback indicator to a second network element other than a first network element that transmitted the transmitted waveform.

In the third embodiment, the at least one memory and the computer program code may also be configured to, with the at least one processor, cause the apparatus at least to provide, in the feedback indicator, a predictive acknowledgment regarding a number of retransmissions necessary to correctly receive the transmitted waveform.

In the third embodiment, the at least one memory and the computer program code may also be configured to, with the at least one processor, cause the apparatus at least to tailor by at least one of beamforming, increasing a spreading factor, decreasing a modulation and coding scheme, or increasing a repetition factor.

In a fourth embodiment, an apparatus can comprise at least one processor and at least one memory comprising computer program code. The at least one memory and the computer program code can be configured to, with the at least one processor, cause the apparatus at least to transmit, to a network element, a transmitted waveform using a transmission pattern. The at least one memory and the computer program code can also be configured to, with the at least one processor, cause the apparatus at least to tailoring a reception pattern to receive a feedback indicator regarding the transmitted waveform from the network element. The reception pattern comprises a broader beam than the transmission pattern.

In the fourth embodiment, the at least one memory and the computer program code may be configured to, with the at least one processor, cause the apparatus at least to tailoring by at least one of selecting an omnidirectional pattern or selecting a beam with maximal gain in two dominant paths to the network element.

In the fourth embodiment, the at least one memory and the computer program code may be configured to, with the at least one processor, cause the apparatus at least to determine that no feedback to the transmitted waveform has been received. The at least one memory and the computer program code may be configured to, with the at least one processor, cause the apparatus at least to perform at least one of rapid searches or beam realignment with respect to the network element.

In the fourth embodiment, the at least one memory and the computer program code may be configured to, with the at least one processor, cause the apparatus at least to receive a predictive acknowledgement from the network element, wherein the predictive acknowledgment may be indicative of a number of retransmissions necessary to correctly receive the transmitted waveform. The at least one memory and the computer program code may also be configured to, with the at least one processor, cause the apparatus at least to make adjustments to transmissions to the network element based on the predictive acknowledgement.

In the fourth embodiment, the at least one memory and the computer program code may be configured to, with the at least one processor, cause the apparatus at least to collect information based on at least one of data content of the feedback indicator, a signal characteristic of the feedback indicator, absence of the feedback indicator, or negative acknowledgments of the transmitted waveform. The at least one memory and the computer program code may be configured to, with the at least one processor, cause the apparatus at least to decide whether to hand over the connection based on the collected information.

In the fourth embodiment, the hand over may comprise a handover to at least one of a layer different from a current layer or a radio access technology different from a current radio access technology.

In the fourth embodiment, the at least one memory and the computer program code may be configured to, with the at least one processor, cause the apparatus at least to initiate retransmission of the transmitted waveform via another layer or radio access technology based on the feedback indicator.

In a fifth embodiment, an apparatus can comprise determining means for determining a feedback indicator regarding reception of a transmitted waveform. The apparatus can also comprise tailoring means for tailoring a signal for transmitting the feedback indicator based on a content of the feedback indicator.

In the fifth embodiment, the tailoring means may be configured to select a modified beam with respect to a previously used beam based on the content of the feedback indicator.

In the fifth embodiment, the tailoring means may be configured to select a broader beam than a beam used during attempted reception of the transmitted waveform.

In the fifth embodiment, the tailoring means may be configured to select a beam with a direction different from a beam used during attempted reception of the transmitted waveform.

In the fifth embodiment, the tailoring means may be configured to select a beam directed to a network element that provided the transmitted waveform on a bearing corresponding to a reflected path to the network element.

In the fifth embodiment, the tailoring means may be configured to select a beam directed to a second network element, other than a first network element that provided the transmitted waveform, on a bearing corresponding to the second network element.

In the fifth embodiment, the tailoring means may be configured to select a plurality of directions corresponding to at least one of known paths to a network element that provided the transmitted waveform or known paths to a plurality of network elements.

In the fifth embodiment, the apparatus may further comprise list means for maintaining a list of possible link directions for at least one network element, wherein the tailoring may be based on the list.

In the fifth embodiment, wherein the at least one network element on the list may comprises a plurality of network elements or all network elements of a cluster of network elements.

In the fifth embodiment, the tailoring means may be configured to select an omnidirectional beam.

In the fifth embodiment, the apparatus may further comprise determination means for determining that the signal produced by the tailoring has not been successfully received. The apparatus may also comprise re-directing means for re-directing the feedback indicator to a second network element other than a first network element that transmitted the transmitted waveform.

In the fifth embodiment, the apparatus may also further comprise acknowledgment means for providing, in the feedback indicator, a predictive acknowledgment regarding a number of retransmissions necessary to correctly receive the transmitted waveform.

In a sixth embodiment, an apparatus can additionally comprise transmitting means for transmitting, to a network element, a transmitted waveform using a transmission pattern. The apparatus can also comprise tailoring means for tailoring a reception pattern to receive a feedback indicator regarding the transmitted waveform from the network element. The reception pattern can comprise a broader beam than the transmission pattern.

In the sixth embodiment, the tailoring means may be configured to select an omnidirectional pattern or to select a beam gain in two dominant paths to the network element.

In the sixth embodiment, the apparatus may further comprise determining means for determining that no feedback to the transmitted waveform has been received. The apparatus may also comprise correction means performing at least one of rapid searches or beam realignment with respect to the network element.

In the sixth embodiment, the apparatus may also comprise receiving means for receiving a predictive acknowledgement from the network element, wherein the predictive acknowledgment may be indicative of a number of retransmissions necessary to correctly receive the transmitted waveform. The apparatus may further comprise adjustment means for making adjustments to transmissions to the network element based on the predictive acknowledgement.

In the sixth embodiment, the apparatus may comprise collection means for collecting information based on at least one of data content of the feedback indicator, a signal characteristic of the feedback indicator, absence of the feedback indicator, or negative acknowledgments of the transmitted waveform. The apparatus may further comprise deciding means for deciding whether to hand over the connection based on the collected information.

In the sixth embodiment, the hand over may comprise a handover to at least one of a layer different from a current layer or a radio access technology different from a current radio access technology.

In the sixth embodiment, the apparatus may further comprise retransmission means for initiating retransmission of the transmitted waveform via another layer or radio access technology based on the feedback indicator.

In a seventh embodiment, a system can comprise a first apparatus comprising transmitting means for transmitting, to a second apparatus, a transmitted waveform using a transmission pattern and tailoring means for tailoring a reception pattern to receive a feedback indicator regarding the transmitted waveform from the second apparatus, wherein the reception pattern broader beam than the transmission pattern. The system can also comprise a second apparatus comprising determining means for determining the feedback indicator regarding reception of the transmitted waveform from the first apparatus and tailoring means for tailoring a signal for transmitting the feedback indicator based on a content of the feedback indicator.

In eighth embodiments, a non-transitory computer readable medium encoded with instructions that, when executed in hardware, perform a process. The process can be the methods of the first and second embodiments, in all their variations.

In a ninth embodiment a computer program product can comprise code for executing the methods of the first and second embodiments, in all their variations.

In the ninth embodiment, the computer program product may be a computer program product comprising a computer-readable medium bearing computer program code embodied therein for use with a computer.

BRIEF DESCRIPTION OF THE DRAWINGS

For proper understanding of the invention, reference should be made to the accompanying drawings, wherein.

DETAILED DESCRIPTION

Figure 1:
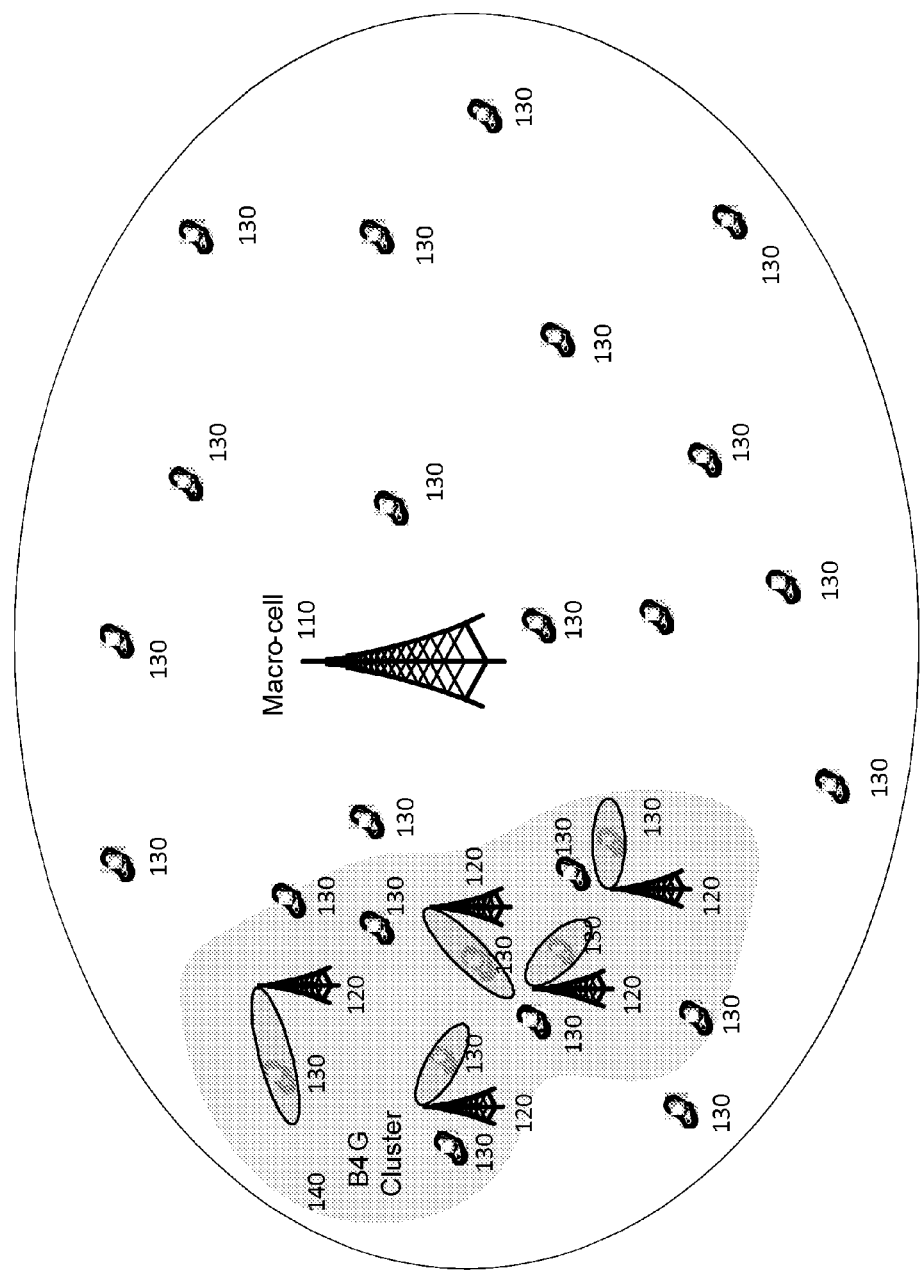
FIG. 1 illustrates a mmWave cluster deployment and LTE overlay.

In mmWave access, a set of co-operating access points or "cluster" of access points, can be deployed to cover an area, for example, a 100 meter radius. A cluster can be used because mmWave may be subject to high shadowing loss and low diffraction, such that each individual coverage area contains multiple shadow regions where radio communication is not supported. Cooperating cluster nodes can be arranged such that these shadowed regions are covered from a unique propagation direction As a result, a user may be covered by multiple access points within the cluster. In addition to mmWave access, LTE in macro-cell type deployment can also be deployed to provide coverage outside the area covered by mmWave access. FIG. 1 illustrates mmWave access deployment and LTE overlay.

As shown in FIG. 1, a macro-cell 110 may comprise a plurality of access points 120 and numerous user equipment 130. A B4G Cluster 140 may comprise a plurality of the access points 120.

Rapid re-routing of the access point may aid in overcoming blockage and/or misalignment factors. To support rapid re-routing, fast feedback from the user equipment (UE) regarding the connection state may be used. The signal for transmitting the feedback indicator may be tailored based on a content of the feedback indicator, where tailoring means to adjust the robustness of the feedback indicator.

This feedback from the user equipment, however, may not reach the access point if the connection has been lost.

One way to tailor the feedback signal is to do beamforming of the feedback indicator. Certain embodiments, therefore, address a beamforming aspect of the feedback information, based on the content of the feedback information to be transmitted. If such a beamforming is unsuccessful, in a subsequent attempt the beam for sending the feedback information may be re-directed to another network element, for example another mmWave access point. The re-direction to another network element may be also done directly. Such an approach may ensure that the feedback information is received by the network as fast as possible in order to initiate rapid re-routing of the connection. Another way to tailor the feedback signal may be to select a more robust transmission scheme (e.g., through selection of a more robust modulation and coding scheme, increasing the repetition factor, increasing the spreading factor, or a combination thereof). (The spreading factor may refer to the number of spreading "chips" per information symbol. Similarly, the repetition factor may refer to how many times the information is repeated within a single transmission. Increasing the spreading factor or increasing the repetition factor may in general increase the robustness of the transmission scheme.) The robustness of the underlying transmission scheme may be adjusted in addition to or instead of the strategy of adjusting how the feedback information is beamformed based on the feedback information.

In the following description the terms "access point" and "user equipment" are used as examples for network elements which could transmit or receive the feedback information. These terms should be understood in a non limiting way, meaning that any other network element type could transmit/receive the feedback information or the transmitting and receiving network elements could be from same network element type (for example both access points or both user equipment). For example, while the example of feedback from user equipment to access point is provided, feedback can also be transmitted the other way, from access point to user equipment, or between pairs of access points, pairs of user equipment, or between other pairs of network elements communicating wirelessly.

The term Millimeter Wave access network is used in the rest of the description just an example for an access network and should be understood non limiting. The invention can be applied to any kind of access network.

The beam may also be directed in a second best direction to the same access point like a reflected ray. Alternatively, the beam may also be omni-directional, or a wider version of the original beam, and may still be received by the first access point if some path exists between the access point and the user equipment.

According to certain embodiments, one approach may be to first beamform a feedback signal from a network element, such as a user equipment, based on the content of the feedback information to be transmitted. If a good radio link connection is determined by the user equipment, the feedback may be sent from the receiver with a same narrow beam used for the reception. The narrow beam used for the reception may have been determined at a previous beam alignment point or based on initial access. Otherwise, a broader beam may be used. The broader beam may allow the signal to be received in case of blockage or misalignment, but the beamforming gain may be lower. The broader beam may simply be a widening of the first beam, it may be an omni-directional beam, or it may be a beam with peak gains in directions to several or all detected paths to the access point.

In another embodiment, the feedback in case of a poor radio link determination may be sent on a narrow beam but to a different path to the same access point. For example, the feedback may be sent in a narrow beam as a reflection of a scatterer, such as a building's side, instead of on a direct path. For the redirected narrow beam to work, the user equipment may maintain a list of possible link directions for the current access point or to other access points. Once feedback is received from the user equipment, the access point may initiate re-routing of the user equipment to another access point based on the received feedback or may initiate a beam realignment to the user equipment in order to keep the link going between the current access point and the user equipment.

For the reception of the feedback message, the access point may always want to use a broader beam on the receiver. The broad beam may have less gain, but may make the reception of a broad beam from the user equipment easier. The broad beam may also make it more likely to receive a narrow beam from the user equipment if the user equipment decides to send the feedback to a different path to the access point, for example, through a reflector. The broad beam at the access point may be omnidirectional or could be a beam with strong gains down the two dominant paths to the user equipment.

As described above, if such a beamforming transmission is not successful, in a second or subsequent attempt the beam for sending the feedback information may be re-directed to another mmWave access point within a cluster of access points, which may ensure that the feedback information is received by the network as fast as possible in order to initiate rapid re-routing of the connection. Alternatively the first step may be omitted and the second step may be performed directly. If no other access point is available, for example, in the case of severe blockage, a beam realignment to the current access point may be used or the user equipment may be rapidly re-routed to an overlay system at a lower frequency like LTE.

In certain embodiments, the feedback may be an indicator of whether a data packet was received or not. For example, the user equipment may have received control information that a data packet is coming, but then did not receive the data packet. This feedback may use a broad beam if the data packet was not received. Complete lack of reception of the packet may indicate that the connection is lost or very poor. Otherwise, the feedback may use a narrow beam pointed in the primary direction of the access point. In another embodiment, the feedback may use a narrow beam which is pointed down an alternate path to the access point, when the data packet is not received. In another embodiment, one or more of the modulation and coding rate, the spreading factor, and the repetition factor of the information may be adjusted to account for the indication that the connection is lost or very poor. Selecting a more robust transmission scheme (for example through using a higher coding rate, a lower modulation order, a higher spreading factor, a higher repetition factor) may be used in conjunction with the above-mentioned beamforming strategy Moreover, in certain embodiments the feedback may be an indicator of the channel condition. The channel condition may be the signal to interference plus noise ratio (SINR), channel quality indicator (CQI), or spectral efficiency. The user equipment may compare the channel condition with the expected value as provided by the assigned modulation and coding scheme (MCS) of the data channel. If the channel is much worse than expected, the user equipment may use a broad beam, or perhaps the aforementioned narrow beam pointing toward an alternate path to the access point. Otherwise, as mentioned above, the user equipment may use a narrow beam to provide an affirmative or positive indication of reception to the access point. Also, as mentioned above, tailoring the signal through the use of a more robust transmission strategy may also be used in conjunction with or instead of this beamforming strategy.

Based on the use of a cluster of access points, in certain embodiments more than one access point may cover the user equipment. Thus, based on the content of the feedback, the user equipment may form narrow beams to alternative access points. This may, for example, be done if each user equipment is assigned a unique sequence so that its signal can be interpreted correctly by the receive access points, and the information can then be forwarded to the cluster coordinator for rapid rerouting.

Moreover, in certain embodiments the feedback may be a predictive ACK/NACK. If the feedback is an ACK, such as a predictive ACK, then the user equipment may use a narrow beam to send the feedback. If the feedback is a NACK, such as a predictive NACK, or the channel is significantly worse than expected, then the user equipment may use a broad beam, or a beam pointing toward an alternate path to the access point, which may be a narrow beam. It may also be possible for the user equipment to use a narrow beam pointed in the primary direction of the access point to send the NACK or predictive NACK. The determination that a channel quality is worse than expected may be made based on the use of a threshold value of channel quality.

If the access point does not receive any feedback, it may also initiate rapid searches and realignment of the beam to locate the receiver. The rapid searches may be conducted via swept beacon or via another access point in the cluster that is visible to the user equipment. The access point may also initiate a realignment if too many NACKs or predictive NACKS are received in a given time period. In another embodiment, for example when NACKs or predictive NACKS are very accurate and/or relatively infrequent, the access point may even initiate a realignment if a single NACK or predictive NACK is sent.

The fast feedback may, in certain embodiments, be used to switch the data transmission from one layer (for example, from pico underlay to macro-cell overlay) or radio access technology (RAT) to another. This switch may be based, for example, on link quality or link failure. Alternatively, the fast feedback may be used to bar the receiver from using mmWave access in this cluster. Barring the user equipment may comprise handing off to another layer or RAT. For example, if a user equipment is connected to both mmWave cluster and LTE macro-cell, it may switch to LTE macro-cell. Additionally, the fast feedback may be used to initiate retransmission of the data packet via another layer or RAT.

According to certain embodiments, the access point may track the number of beam realignment attempts and associated feedback results, for example, no feedback received or NACKs/predictive NACKS. Based on these statistics over time, the access point may initiate switching of data transmission to another layer or RAT.

Likewise, the access point may collect feedback statistics, such as statistics on NACKs and/or predictive NACKs, signal to interference plus noise ratios (SINRs), and/or number of transmissions required, and associated information, such as beam calibration information. The access point may then determine whether to hand over a receiver from using mmWave in this cluster.

In a further embodiment, a transmitter may send several (M) transmissions of the same data packet. If the receiver is simply chase combining the multiple received packets, it may send back an indicator that conveys the idea that "after the Nth received packet (N<M), I predicted a success," for example, the predictive mechanism told the receiver (Rx) that after combining N identical copies the Rx would have a success. So, the transmitter would know, based on the indicator, that the transmitter may either increase its own transmit power by a factor N, choose a modulation and coding scheme (MCS) that can tolerate a factor N reduction in transmit power, or the like. Alternatively the transmitter may also increase/decrease the number of transmissions of the same packet. Then, the next time, the transmitter may make the adjustments, such as adjustments to MCS, transmit power, or the like, desired to overcome the original need for factor N combining.

Figure 2:
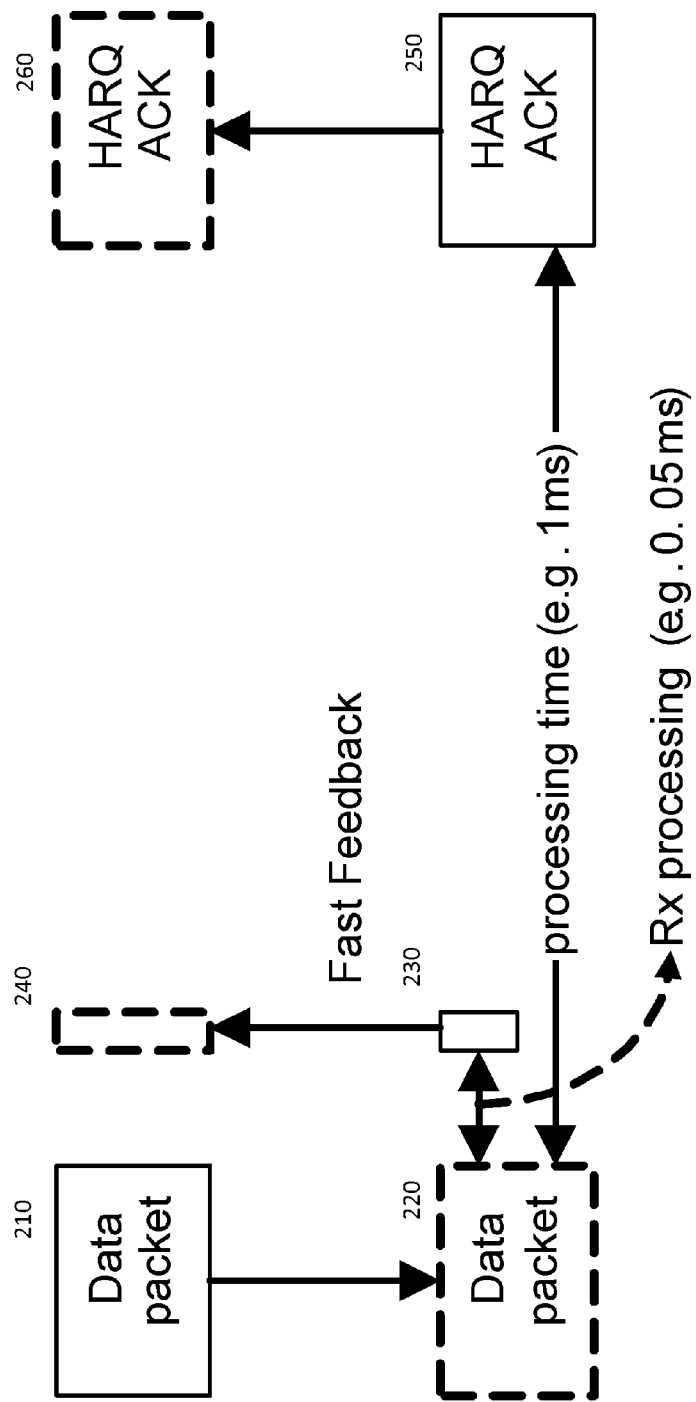
FIG. 2 illustrates a fast feedback channel after minimum receiver processing.

Certain embodiments, more specifically, may provide a fast feedback channel after minimum processing, subsequent to reception of the data or control subframe. An example is shown in FIG. 2 for data channel reception. The purpose of the fast feedback channel is to inform the transmitter that the packet has been received. It may also provide early warning to the transmitter about link problems, for example, that the link is too weak or being blocked. Additional information such as the SINR of the received data packet, SINR of the control packet, reliability information of the control packet, for example, log-likelihood ratio determination, may also be comprised as part of the feedback. The receiver only has to perform minimum processing to provide such feedback. Such minimum processing may comprise, for example, demodulation reference signal (DMRS), for example, user-specific reference signals, detection, SINR determination, preamble sequence reception, control channel reception, ACK/NACK prediction, and the like.

FIG. 2 illustrates a fast feedback channel after minimum receiver processing. As shown in FIG. 2, the processing time for fast feedback may be quite short, for example, 0.05 ms, compared to the time need for hybrid automatic repeat request (HARQ) processing, for example, 1 ms.

For example a sent data packet 210 from a first network element can be transmitted to become a received data packet 220 at a second network element. Likewise a sent fast feedback 230 from the second network element can be transmitted to become a received fast feedback 240 at the first network element. Moreover, a sent HARQ ACK 250 can be transmitted to become a received HARQ ACK 260.

Fast feedback may be used even if the PHY HARQ channel is not present. In this case, fast feedback may permit the transmitter to perform early retransmission of the data packet without having to wait for ARQ feedback from the higher-layer. This may substantially reduce latency associated with higher-layer HARQ.

Because the prescribed receiver processing time may be determined based on the peak data rate, in practice the receiver may have time to combine multiple transmissions prior to the need to provide HARQ feedback. For instance, at 30 Gbps the receiver may require 1 ms to process the data packet, but at 100 Mbps, the receiver may only require 0.2 ms to process the data packet. Thus, this fast feedback channel may also be used to transmit actual ACK/NACK prior to the actual prescribed HARQ ACK timing. This may allow the transmitter to send multiple copies of the data packet for combining at the receiver in time for HARQ feedback.

Moreover, in certain embodiments the fast feedback may be in the form of a sequence plus potentially a small amount of information. The sequence may be short to allow for rapid detection. It may also be user specific, but this may not be necessary, as user information may be determined based on timing relationship if, for example, only one user is supported in each subframe.

The information may be carried on top of a sequence using, for example, symbol modulation on top of the sequence, cyclic shifting of the sequence, or spreading via an orthogonal cover code.

The fast feedback channel may, in some cases, be designed to contain information not just indicating that a beam realignment is needed, but to contain more information that may assist in that alignment. For example, the feedback channel may comprise an indicator of the best beam when, for example, there may be some type of continual monitoring of the best transmission (Tx) beam being done by the Rx.

Some examples of sequence and information may comprise the following: on/off transmission of sequence to indicate whether the data packet was received; 4-bit information carrying the CQI as determined from the received reference signals—16-QAM symbol or two quadrature phase shift keyed (QPSK) symbols are modulated on top of a user equipment-specific sequence; 1-bit ACK/NACK predictor of the data packet—sequence selection or different cyclic shifts of a Zadoff-Chu base sequence; 1-bit ACK/NACK of the data packet in case the receiver processing time is significantly shorter, for example, due to smaller data packet; 2-bit channel reliability determination based on control packet demodulation—QPSK symbol is modulated on top of a user equipment-specific sequence; or adjusted received SINR using effective exponential SINR metric (EESM) or mutual information per bit (MIB) mapping.

The sequence may be very short and multiple users may be time division multiplexed (TDM), code division multiplexed (CDM), or frequency division multiplexed (FDM) together. This, of course, may depend on whether multiple users are allowed to share the subframe in a CDM or FDM manner.

The sequence may be sent from the receiver with the same narrow beam, a beam determined at a previous beam alignment point, used for the reception. Alternatively the receiver may use a broader beam for sending the sequence, when stronger coding/spreading is used for the sequence to make up for the beamforming loss. The broader beam may be particularly useful if a predictive NACK is being sent, which was caused by a poor link, for example, due to blockage, and hence the beam-realignment may be reinstated sooner than waiting for a NACK after the packet is decoded.

Figure 3:
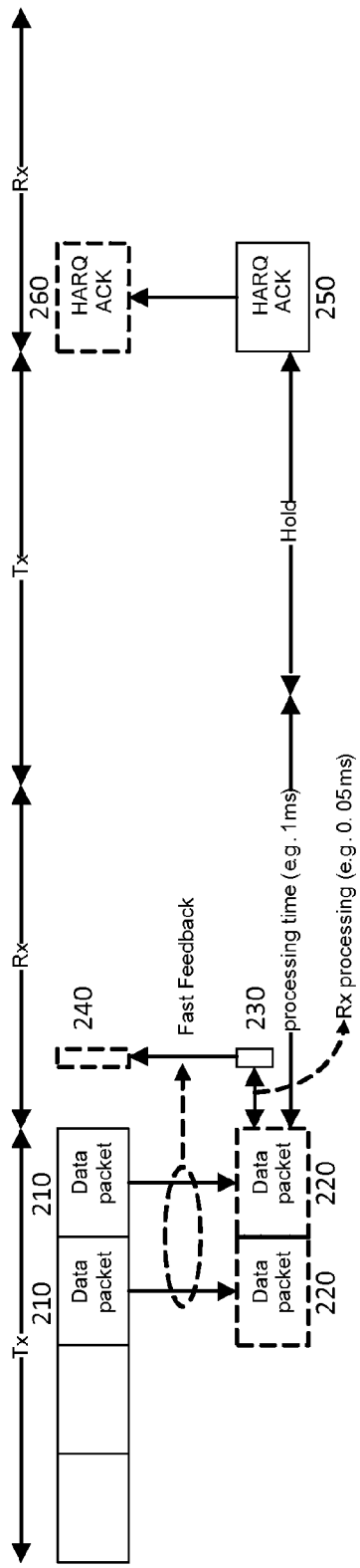
FIG. 3 illustrates a fast feedback channel in a time division duplex system.

For a time division duplex (TDD) system, the latency may be significantly longer due to a need to wait for a Tx period by the receiver. FIG. 3 illustrates a fast feedback channel in a time division duplex system.

As shown in FIG. 3, the processing time for processing a data packet may contribute only part of the delay, as additional time may be spent on hold, waiting an appropriate time for HARQ feedback. As a result, it may be valuable to provide fast feedback for TDD as soon as possible. Furthermore, within the Rx period, multiple data packets can arrive. Thus, feedback may be required for more than one received packets.

The feedback may contain information about multiple received data packets—either via bundling of all the feedbacks or through multiplexing of feedbacks. This may be, for instance, predicted ACK/NACK for the data packets, for example, bundled or multiplexed. It may also be the effective SINR or CQI over all received data packets.

For example multiple sequential sent data packets 210 from a first network element can be transmitted to become received data packets 220 at a second network element. Likewise a sent fast feedback 230 from the second network element can be transmitted to become a received fast feedback 240 at the first network element. Moreover, a sent HARQ ACK 250 can be transmitted to become a received HARQ ACK 260, a relatively long time after the fast feedback has been sent.

Detailed methods regarding the transmitter's response to this fast feedback may also or alternatively be comprised within certain embodiments. The transmitter's response may comprise such features as beam realignment, tracking, and width adjustment; preemptive retransmission of the packet; fast link adaptation; and switching of data transmission to a different layer, for example, to macro-cell.

For example, in certain embodiments, based on the feedback information, the transmitter may decide to retransmit the packet prior to reception of the physical layer (PHY) HARQ acknowledgement. For example, the transmitter may preemptively retransmit the packet if the receiver sends a NACK predictor or received SINR report that is too low for the transmitted packet.

Different response strategies may be employed depending on whether the feedback is received or not. For example, in the absence of feedback, the transmitter may initiate realignment procedure, whereas if a NACK is detected, retransmission may be sufficient.

If the transmitter does not receive any feedback, it may also initiate rapid searches and realignment of the transmitter beam to locate the receiver. The transmitter may also initiate a realignment if too many predictive NACKs are received in a given time period or may even initiate a realignment if a single predictive NACK is sent, when predictive NACKs are very accurate and/or relatively infrequent.

As described above, the actual receiver processing time may be significantly smaller than the prescribed time, for example, when smaller packets are transmitted or when processing power in the receiver is enhanced. Thus, using this rapid feedback, the transmitter may be able to send several transmissions of the same data packet to the receiver prior to the HARQ ACK timing. The receiver may then combine these transmissions to aid in packet demodulation. This channel may, therefore, be used for fast packet-based link adaptation, for example using power control or MCS adaptation, as well as being used for incremental redundancy. For the retransmission, the transmitter may use the same narrow beam used for the first transmission or alternatively may use a broader beam to compensate for any possible misalignment from blockages or from tracking issues. Even though the broader beam may have a lower gain, it may still be useful since the receiver may combine it with a previous transmission.

If the feedback channel may be used for incremental redundancy, the receiver may transmit the received CQI of the data packet back to the transmitter. Based on CQI mismatch when the MCS was selected and when the packet was received, the transmitter may determine the additional amount of incremental redundant symbols to transmit to the receiver.

On the other hand, if the feedback channel may be used for power control, the receiver may transmit the received SINR and the transmitter may then adjust the transmitter's own transmit power accordingly.

When the transmitter sends several (M) transmissions of the same data packet, if the receiver is simply chase combining the multiple received packets, the receiver may send back an indicator indicating that success may be predicted after an Nth received packet (N<M), namely that the predictive mechanism told the receiver that after combining N identical copies it would have a success. So, the transmitter would be able to determine whether it may either increase its own transmit power by a factor N, choose an MCS that can tolerate a factor N reduction in transmit power, or the like. Alternatively the transmitter may also increase/decrease the number of transmissions of the same packet. Then, the next time, the transmitter may make the adjustments, such as adjustments to MCS, transmit power, or the like, so as to overcome the original need for factor N combining.

In a millimeter-wave access system, the receiver may be connected to multiple layers and multiple RATs, for example, via LTE to the overlay macro-cell and via millimeter-wave to the underlay cell. This fast feedback may be used to switch the data transmission from one layer or RAT to another. The switch may be based on link quality or link failure, for example. The fast feedback may also or alternatively be used to bar the receiver from using millimeter-wave access in this cluster. Barring the user equipment may comprise handing off the user equipment to another layer or RAT or another millimeter-wave cluster. Additionally, the fast feedback may be used to initiate retransmission of the data packet via another layer or RAT.

Furthermore, in certain embodiments the transmitter may track the number of beam realignment attempts and associated feedback results. The feedback results may comprise, for example, no feedback received or NACKs/predicted NACKs received. Based on these statistics over time, the transmitter may initiate switching of data transmission to another layer or RAT.

Alternatively or additionally, the transmitter may collect feedback statistics, such as NACKs, predictive NACKs, SINRs, and/or number of transmissions required, and associated information, such as beam calibration information. The transmitter may then determine whether to hand over a receiver from using millimeter-access in this cluster.

Figure 4:
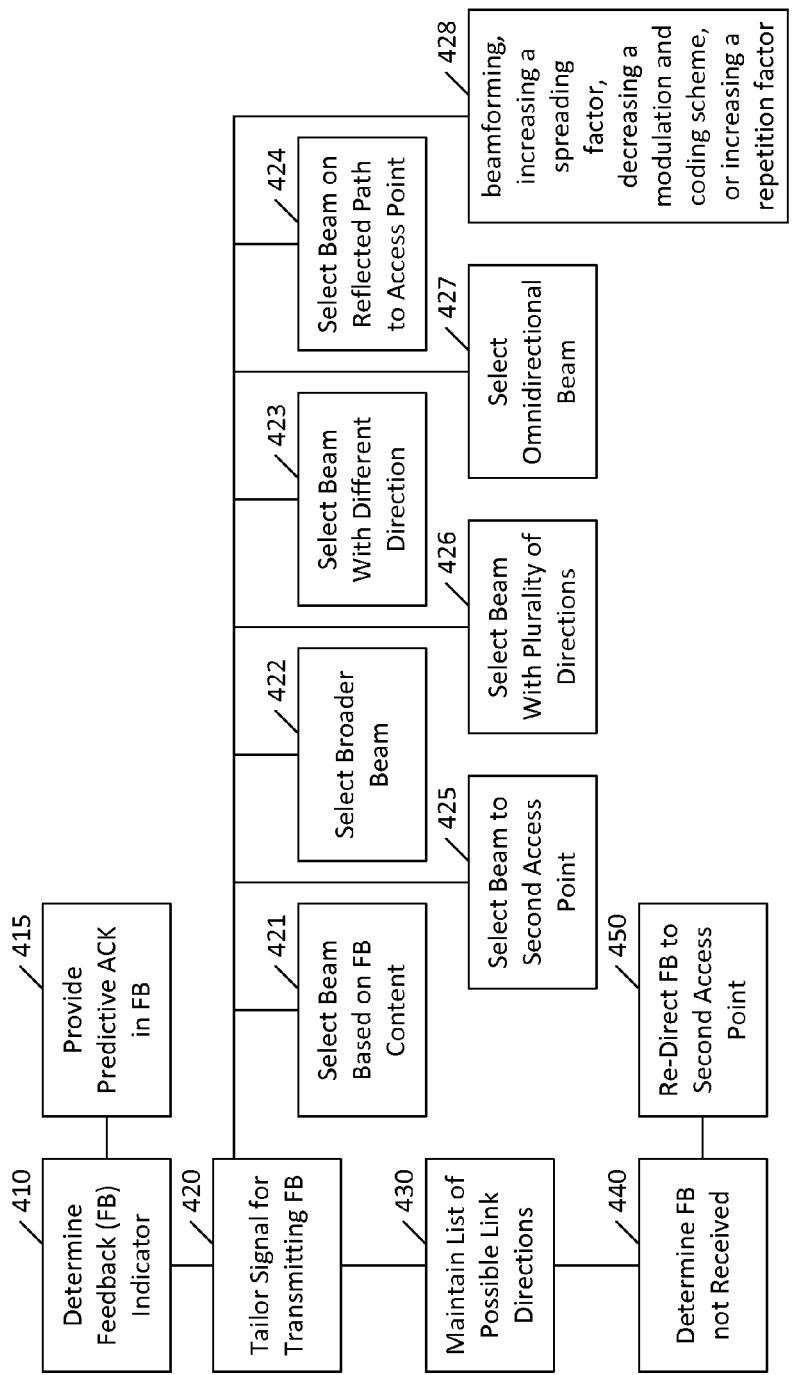
FIG. 4 illustrates a method according to certain embodiments.

FIG. 4 illustrates a method according to certain embodiments. The method of FIG. 4 may be performed by, for example, a user equipment or an access point. As shown in FIG. 4, a method may comprise, at 410, determining a feedback indicator regarding reception of a transmitted waveform, such as a data packet or a control packet. The method may also comprise, at 420, tailoring, for example beamforming, a signal for transmitting the feedback indicator based on a content of the feedback indicator.

The tailoring may comprise, at 421, selecting a modified beam with respect to a previously used beam based on the content of the feedback indicator. The tailoring may also comprise, at 422, selecting a broader beam than a beam used during attempted reception of the transmitted waveform. The tailoring may further comprise, at 423, selecting a beam with a direction different from a beam used during attempted reception of the transmitted waveform. Furthermore, the tailoring may comprise, at 424, selecting a beam directed to an access point that provided the transmitted waveform on a bearing corresponding to a reflected path to the access point. Moreover, the tailoring may comprise, at 425, selecting a beam directed to a second access point, other than a first access point that provided the transmitted waveform, on a bearing corresponding to the second access point. The tailoring may also comprise, at 426, selecting a plurality of directions corresponding to at least one of known paths to an access point that provided the transmitted waveform or known paths to a plurality of access points. Alternatively, the tailoring may comprise, at 427, selecting an omnidirectional beam. In general, the tailoring may comprise, for example, beamforming, increasing a spreading factor, decreasing a modulation and coding scheme, or increasing a repetition factor, or any combination thereof.

The method may also comprise, at 430, maintaining a list of possible link directions for at least one access point, wherein the tailoring may be based on the list. The list may comprise access node identification and/or cluster identification. The at least one access point may comprise a plurality of access points or all access points of a cluster of access points. The plurality of access points do not have to all be from the same cluster. For example, the plurality of access points may comprise access points from one or more adjacent cluster.

The method may further comprise, at 440, determining that the signal produced by the tailoring has not been successfully received. Moreover, the method may comprise, at 450, re-directing the feedback indicator to a second access point other than a first access point that transmitted the transmitted waveform.

The method may also comprise, at 415, providing, in the feedback indicator, a predictive acknowledgment or not acknowledgement regarding a number of retransmissions necessary to correctly receive the transmitted waveform.

Figure 5:
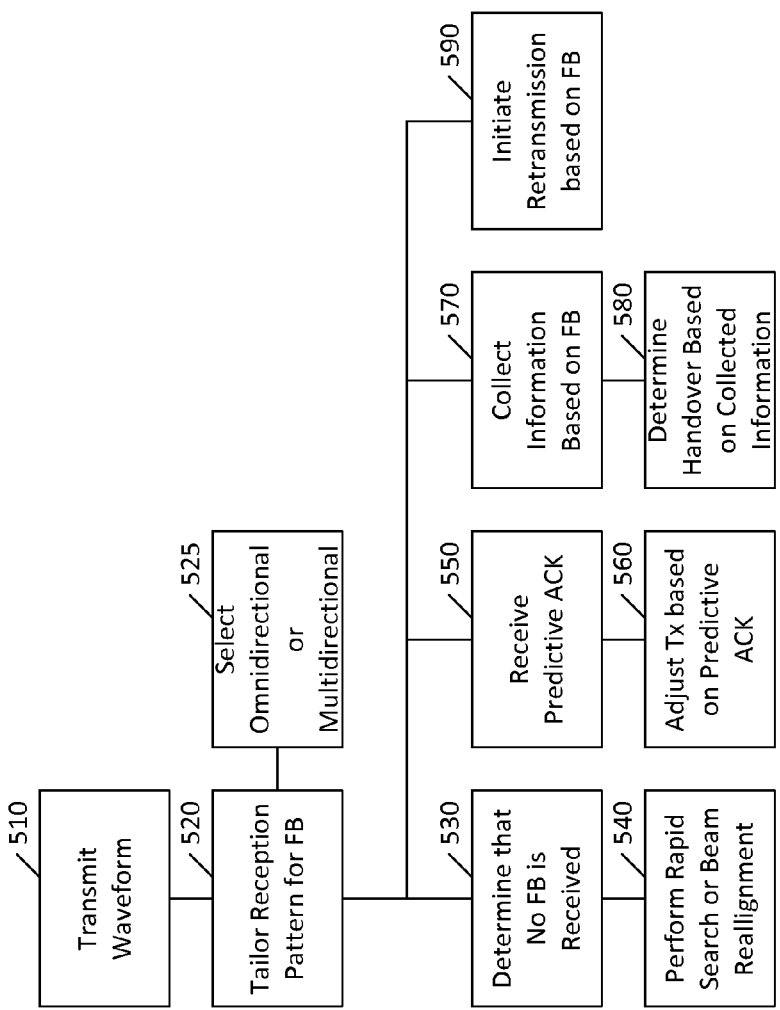
FIG. 5 illustrates another method according to certain embodiments.

FIG. 5 illustrates another method according to certain embodiments. The method of FIG. 5 may be performed by, for example, an access point or a user equipment. As shown in FIG. 5, the method may comprise, at 510, transmitting, to a network element such as for example a user equipment, a transmitted waveform using a transmission pattern. The method may comprise, at 520, tailoring, for example beamforming, a reception pattern to receive a feedback indicator regarding the transmitted waveform from the network element. The reception pattern may comprise a broader beam than the transmission pattern.

The tailoring may comprise, at 525, selecting a pattern selected from an omnidirectional pattern and a beam gain in two dominant paths to the network element.

The method may also comprise, at 530, determining that no feedback to the transmitted waveform has been received and, at 540, may comprise performing at least one of rapid searches or beam realignment with respect to the network element.

The method may further comprise, at 550, receiving a predictive acknowledgement from the network element, wherein the predictive acknowledgment may be indicative of a number of retransmissions necessary to correctly receive the transmitted waveform. The method may also comprise, at 560, making adjustments to transmissions to the network element based on the predictive acknowledgement.

The method may additionally comprise, at 570, collecting information based on at least one of data content of the feedback indicator, a signal characteristic of the feedback indicator, absence of the feedback indicator, or negative acknowledgments of the transmitted waveform. Moreover, the method may comprise, at 580, deciding whether to hand over to an alternate network element based on the collected information. The hand over may comprise a handover to at least one of a layer different from a current layer or a radio access technology different from a current radio access technology.

The method may also comprise, at 590, initiating retransmission of the transmitted waveform via another layer or radio access technology based on the feedback indicator.

Figure 6:
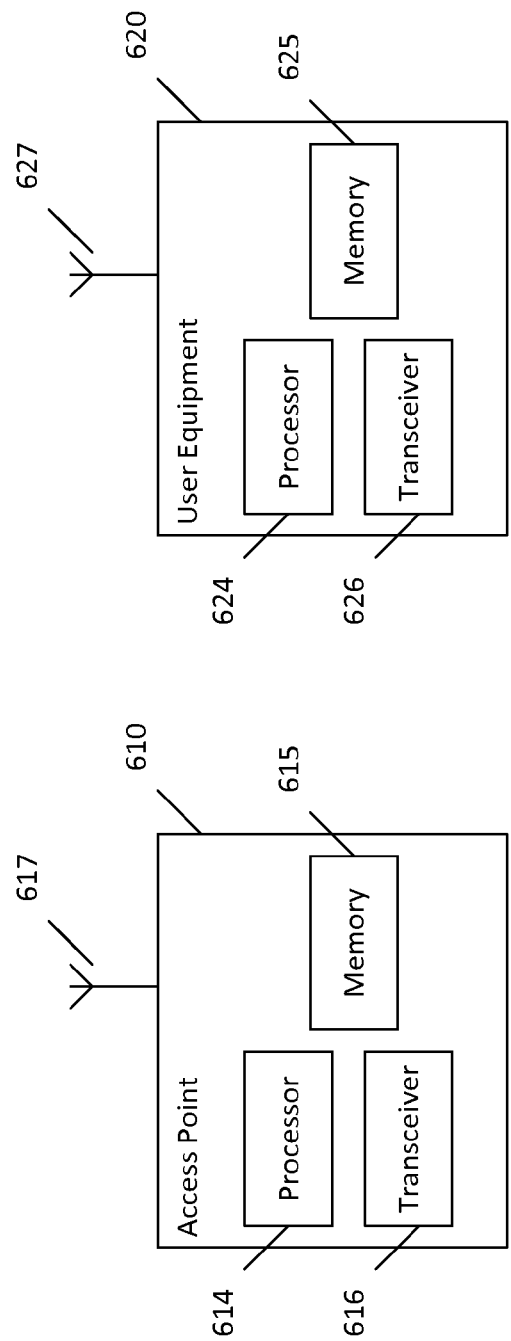
FIG. 6 illustrates a system according to certain embodiments of the invention.

FIG. 6 illustrates a system according to certain embodiments of the invention. In one embodiment, a system may comprise several devices, such as, for example, access point 610 and UE 620. The system may comprise more than one UE 620 and more than one access point 610, although only one of each is shown for the purposes of illustration. The system may also involve only at least two UEs 620 or only at least two access points 610. Each of these devices may comprise at least one processor, respectively indicated as 614 and 624. At least one memory may be provided in each device, and indicated as 615 and 625, respectively. The memory may comprise computer program instructions or computer code contained therein. One or more transceiver 616 and 626 may be provided, and each device may also comprise an antenna, respectively illustrated as 617 and 627. Although only one antenna each is shown, many antennas and multiple antenna elements may be provided to each of the devices. Other configurations of these devices, for example, may be provided. For example, access point 610 and UE 620 may be additionally configured for wired communication, in addition to wireless communication, and in such a case antennas 617 and 627 may illustrate any form of communication hardware, without being limited to merely an antenna.

Transceivers 616 and 626 may each, independently, be a transmitter, a receiver, or both a transmitter and a receiver, or a unit or device that may be configured both for transmission and reception.

Processors 614 and 624 may be embodied by any computational or data processing device, such as a central processing unit (CPU), application specific integrated circuit (ASIC), or comparable device. The processors may be implemented as a single controller, or a plurality of controllers or processors.

Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as access point 610 and UE 620, to perform any of the processes described above (see, for example, FIGS. 2-5). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 6 illustrates a system including an access point 610 and a UE 620, embodiments of the invention may be applicable to other configurations, and configurations involving additional elements, as illustrated and discussed herein. For example, multiple user equipment devices and multiple access points may be present as shown in FIG. 1, or other nodes providing similar functionality, such as relays which may receive data from an access point and forward the data to a UE and may implement both functionality of the UE and functionality of the access point.

Figure 7:
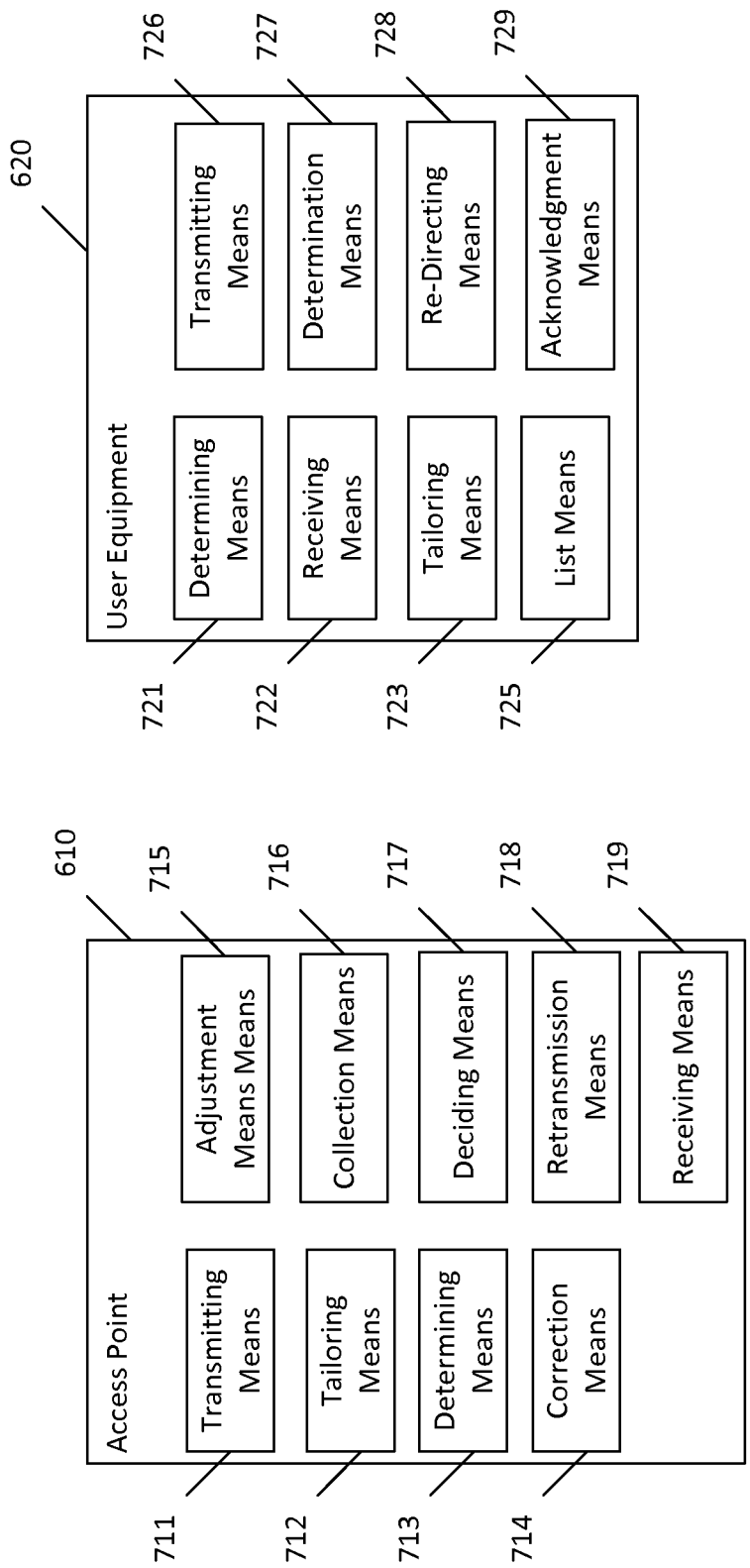
FIG. 7 illustrates another system according to certain embodiments of the invention.

FIG. 7 illustrates another system according to certain embodiments of the invention. The system may comprise an access point 610, and a user equipment 620. Certain embodiments, however, may be used in connection with user equipment to user equipment communication or access point to access point communication, as well as communication amongst other kinds of network elements, such as relay nodes.

The user equipment 620 may comprise determining means 721 for determining a feedback indicator regarding reception of a transmitted waveform. The user equipment 620 may also comprise tailoring means 723 for tailoring a signal for transmitting the feedback indicator based on a content of the feedback indicator. The user equipment 620 may also comprise receiving means 722 for receiving signals, such as the transmitted waveform, and transmitting means 726 for transmitting signals, such as the signal comprising the feedback indicator.

The tailoring means 723 may be configured to select a modified beam with respect to a previously used beam based on the content of the feedback indicator. Moreover, the tailoring means 723 may be configured to select a broader beam than a beam used during attempted reception of the transmitted waveform. Furthermore, the tailoring means 723 may be configured to select a beam with a direction different from a beam used during attempted reception of the transmitted waveform.

The tailoring means 723 may also be configured to select a beam directed to an access point that provided the transmitted waveform on a bearing corresponding to a reflected path to the access point. Furthermore, the tailoring means 723 may be configured to select a beam directed to a second access point, other than a first access point that provided the transmitted waveform, on a bearing corresponding to the second access point.

Additionally, the tailoring means 723 may be configured to select a plurality of directions corresponding to at least one of known paths to an access point that may provide the transmitted waveform or known paths to a plurality of access points. Furthermore, the tailoring means 723 may be configured to select an omnidirectional beam.

The user equipment 620 may further comprise list means 725 for maintaining a list of possible link directions for at least one access point, wherein the tailoring is based on the list. The list may also comprise information about the cluster(s) to which the access points belong. The at least one access point may comprise a plurality of access points or all access points of a cluster of access points.

The user equipment 620 may further comprise determination means 727 for determining that the signal produced by the tailoring has not been successfully received and re-directing means 728 for re-directing the feedback indicator to a second access point other than a first access point that transmitted the transmitted waveform.

The user equipment 620 may comprise acknowledgment means 729 for providing, in the feedback indicator, a predictive acknowledgment regarding a number of retransmissions necessary to correctly receive the transmitted waveform.

The access point 610 may comprise transmitting means 711 for transmitting, to a network element, a transmitted waveform using a transmission pattern. The access point 610 may also comprise tailoring means 712 for tailoring a reception pattern to receive a feedback indicator regarding the transmitted waveform from the network element. The reception pattern may be a broader beam than the transmission pattern. The access point 610 may also comprise receiving means 719 for receiving the feedback indicator.

The tailoring means 712 may be configured to select a pattern selected from an omnidirectional pattern and a beam gain in two dominant paths to the network element.

The access point 610 may also comprise determining means 713 for determining that no feedback to the transmitted waveform has been received. The transmitted waveform may encode a data packet intended for the receiving device, control information intended for the receiving device or simply a known pilot sequence. Moreover, the access point 610 may comprise correction means 714 performing at least one of rapid searches or beam realignment with respect to the network element.

The access point 610 may additionally comprise receiving means 719 for receiving a predictive acknowledgement from the network element. The predictive acknowledgment may be indicative of a number of retransmissions necessary to correctly receive the transmitted waveform. The access point 610 may further comprise adjustment means 715 for making adjustments to transmissions to the network element based on the predictive acknowledgement.

The access point 610 may also comprise collection means 716 for collecting information based on at least one of data content of the feedback indicator, a signal characteristic of the feedback indicator, absence of the feedback indicator, or negative acknowledgments of the transmitted waveform. Moreover, the access point 610 may comprise deciding means 717 for deciding whether to hand over to an alternate network element based on the collected information. The hand over may be or may comprise a handover to at least one of a layer different from a current layer or a radio access technology different from a current radio access technology.

The access point 610 may further comprise retransmission means 718 for initiating retransmission of the transmitted waveform via another layer or radio access technology based on the feedback indicator.

In certain embodiments, it is assumed that a directional link has already been established between one of the access point in a cluster of access points and the user equipment using access procedures, such as a sync channel and random access channel (RACH). However, other implementations of certain embodiments are also possible.

Thus, one having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY mmWave Millimeter wave
HARQ Hybrid Automatic Repeat Request
ACK Positive acknowledgement
NACK Negative acknowledgement
PHY Physical layer
TBS Transport block size
B4G Beyond 4G
RAT Radio Access Technology
LTE Long Term Evolution
LTE Het Net Long Term Evolution Heterogeneous Network
PA Power Amplifier
Gbps Giga bit per second
eNB evolved Node B (base station)
CQI Channel quality Indicator

We claim:

1. A method, comprising:
transmitting, from a first network element to a second network element, a transmitted waveform using a transmission pattern;
tailoring a reception pattern to receive a feedback indicator regarding the transmitted waveform from the second network element; and
initiating retransmission of the transmitted waveform via another layer or radio access technology based on the feedback indicator,
wherein the reception pattern comprises a broader beam than the transmission pattern.

2. The method of claim 1, wherein the tailoring comprises at least one of selecting an omnidirectional pattern or selecting a beam with maximal gain in two dominant paths to the second network element.

3. The method of claim 1, further comprising:
determining that no feedback to the transmitted waveform has been received; and
performing at least one of rapid searches or beam realignment with respect to the second network element.

4. The method of claim 1, further comprising:
receiving a predictive acknowledgement from the second network element, wherein the predictive acknowledgment is indicative of a number of retransmissions necessary to correctly receive the transmitted waveform; and
making adjustments to transmissions to the second network element based on the predictive acknowledgement.

5. The method of claim 1, further comprising:
collecting information based on at least one of data content of the feedback indicator, a signal characteristic of the feedback indicator, absence of the feedback indicator, or negative acknowledgments of the transmitted waveform; and
deciding whether to hand over the connection based on the collected information.

6. An apparatus, comprising:
at least one processor; and
at least one memory including computer program code;
the at least one memory and the computer program code configured to, with the at least one processor, cause the apparatus at least to perform:
transmitting, to a network element, a transmitted waveform using a transmission pattern;
tailoring a reception pattern to receive a feedback indicator regarding the transmitted waveform from the network element; and
initiating retransmission of the transmitted waveform via another layer or radio access technology based on the feedback indicator,
wherein the reception pattern comprises a broader beam than the transmission pattern.

7. The apparatus of claim 6, wherein the tailoring includes selecting an omnidirectional pattern or to select a beam gain in two dominant paths to the network element.

8. The apparatus of claim 6, wherein the at least one memory and the computer program code are configured to, with the at least one processor, cause the apparatus to further perform:

determining that no feedback to the transmitted waveform has been received; and performing at least one of rapid searches or beam realignment with respect to the network element.

9. The apparatus of claim 6, wherein the at least one memory and the computer program code are configured to, with the at least one processor, cause the apparatus to further perform:

receiving a predictive acknowledgement from the network element, wherein the predictive acknowledgment is indicative of a number of retransmissions necessary to correctly receive the transmitted waveform; and making adjustments to transmissions to the network element based on the predictive acknowledgement.

10. The apparatus of claim 6, wherein the at least one memory and the computer program code are configured to, with the at least one processor, cause the apparatus to further perform:

collecting information based on at least one of data content of the feedback indicator, a signal characteristic of the feedback indicator, absence of the feedback indicator, or negative acknowledgments of the transmitted waveform; and deciding whether to hand over the connection based on the collected information.

11. A computer program product embodied on a non-transitory computer readable medium, said computer-readable medium comprising code for executing the following method:

transmitting, from a first network element to a second network element, a transmitted waveform using a transmission pattern;

tailoring a reception pattern to receive a feedback indicator regarding the transmitted waveform from the second network element; and initiating retransmission of the transmitted waveform via another layer or radio access technology based on the feedback indicator, wherein the reception pattern comprises a broader beam than the transmission pattern.

\* \* \* \* \*